United States Patent [19]

Hogan

[11] 4,414,994

[45] Nov. 15, 1983

[54] EARTHQUAKE FIRE SAFETY SYSTEM

[76] Inventor: Roderick D. Hogan, 22487 Fuller Ave., Hayward, Calif. 94541

[21] Appl. No.: 322,522

[22] Filed: Nov. 18, 1981

[51] Int. Cl.$^3$ .............................................. F16K 17/36
[52] U.S. Cl. .................................... 137/38; 200/61.47
[58] Field of Search ............................. 137/38, 39, 46; 200/61.45 R, 61.47

[56] References Cited

U.S. PATENT DOCUMENTS

| | | | |
|---|---|---|---|
| 1,666,122 | 4/1928 | Denniston | 200/61.47 |
| 2,207,406 | 7/1940 | Jones | 200/61.47 |
| 3,634,885 | 1/1972 | Barkley | 200/61.47 X |
| 4,263,928 | 4/1981 | Kobayashi | 137/39 |

Primary Examiner—Robert G. Nilson
Attorney, Agent, or Firm—Linval B. Castle

[57] ABSTRACT

An earthquake safety system employing a shock triggered electrical switch for opening electrical contacts in the cables between the power utility input to a building and the distribution circuit breaker box. The switch is adjustable to be closed by earthquakes of predetermined magnitudes. Normally-closed solenoid gas and water valves coupled to breakers in the circuit breaker box will close upon the opening of the contacts to prevent gas fire and water damage and loss of water main pressure.

7 Claims, 3 Drawing Figures

EARTHQUAKE FIRE SAFETY SYSTEM

BRIEF SUMMARY OF THE INVENTION

This invention relates to safety systems and in particular to a system for instantly shutting off electricity, gas and water supplies in residential or industrial buildings upon occurrence of a shock, such as an earthquake of predetermined magnitude.

It is well-known that the greatest damage and destruction of buildings caused by earthquakes with magnitudes over 6.5 or 7.0 actually results from fire caused by broken gas mains and short-circuited electric wiring. Broken water pipes also cause some water damage to buildings but the most damaging results from broken water pipes are the pressure losses in water mains used for fire fighting and/or the rapid drainage of the water storage reservoirs.

The safety system described herein will respond to an earthquake of some predetermined magnitude and instantly operate to shut off gas, water and electricity to the structure to which it is connected.

Briefly described, the safety system includes a housing containing a normally-off electrical contactor connected between the electric service entrance and the distribution circuit-breaker panel. The contactor is held closed by an electrical excitation coil that is controlled by an adjustable shock-sensitive switch so that an earthquake of predetermined magnitude will open the power to the excitation coil circuit and contactor contacts. Normally-closed solenoid gas and water valves connected to the power distribution panel circuit breakers will therefore close to shut down the gas and water supply. A low voltage alarm transformer may be coupled ahead of the contactor to provide a safe low-voltage, low-current circuit for burglar alarms, smoke detectors, etc.

BRIEF DESCRIPTION OF THE DRAWINGS

In the drawings which illustrate the preferred embodiment of the invention.

DETAILED DESCRIPTION

Figure 1:
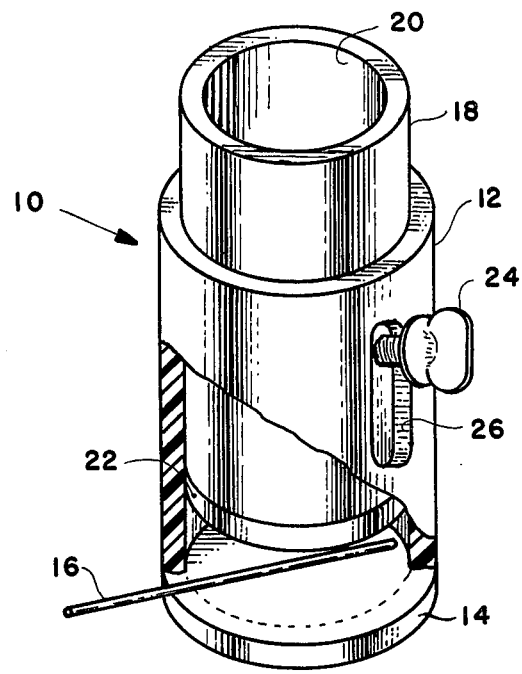
FIG. 1 is a sectional elevation view illustrating the details of the adjustable shock-sensitive triggering switch.

Illustrated in FIG. 1 is a sectional elevation view of a reliable, shock-sensitive switch which may be adjusted to close an electrical circuit upon the occurrence of shocks or earthquakes of various magnitudes. The switch 10 of FIG. 1 includes an outer tubular housing 12 of a non-conductive material such as plastic. Housing 12 includes a floor section 14 completely covering the bottom end of the housing and sealed thereto by a suitable cement. An electrical conductor, such as copper wire 16, is threaded through a hole (not shown) in the lower wall of the housing 12 and closely overlies the surface of the floor section 14. Conductor 16 is sealed in the plastic material of the housing 12 so that no fluid leakage can occur between the conductor 16 and its entrance hole.

Closely fit within the bore of the housing 12 but slidable therein is a tubular core member 18 having an open top end 20 and a lower end covered with a conductive disc 22 which is preferably formed of a copper disc approximately ⅛th inch in thickness. In operation, an electrical conductor (not shown) enters through the top of the core member 18 and is soldered to the interior top surface of the disc 22. An electrically conductive fluid such as mercury is placed on top of the housing floor 14 and in electrical contact with the conductor 16. This conductive fluid (not shown), when subjected to a shock such as from an earthquake, will form a momentary contact between the conductor 16 and the disc 22 to close an electrical circuit.

The sensitivity of switch 10 may be adjusted by vertically sliding the core member 18 within the tubular housing 12 to either widen or narrow the gap between the disc 22 and the top surface of the conductive fluid overlying the conductor 16. When the desired spacing is obtained, a thumb screw 24 threaded in a tapped hole in the side wall of the core member 18 and extending through a vertical or spiral slot 26 in the wall of the housing 12, may be tightened to assure against further vertical movement between the core and the housing.

Figure 2:
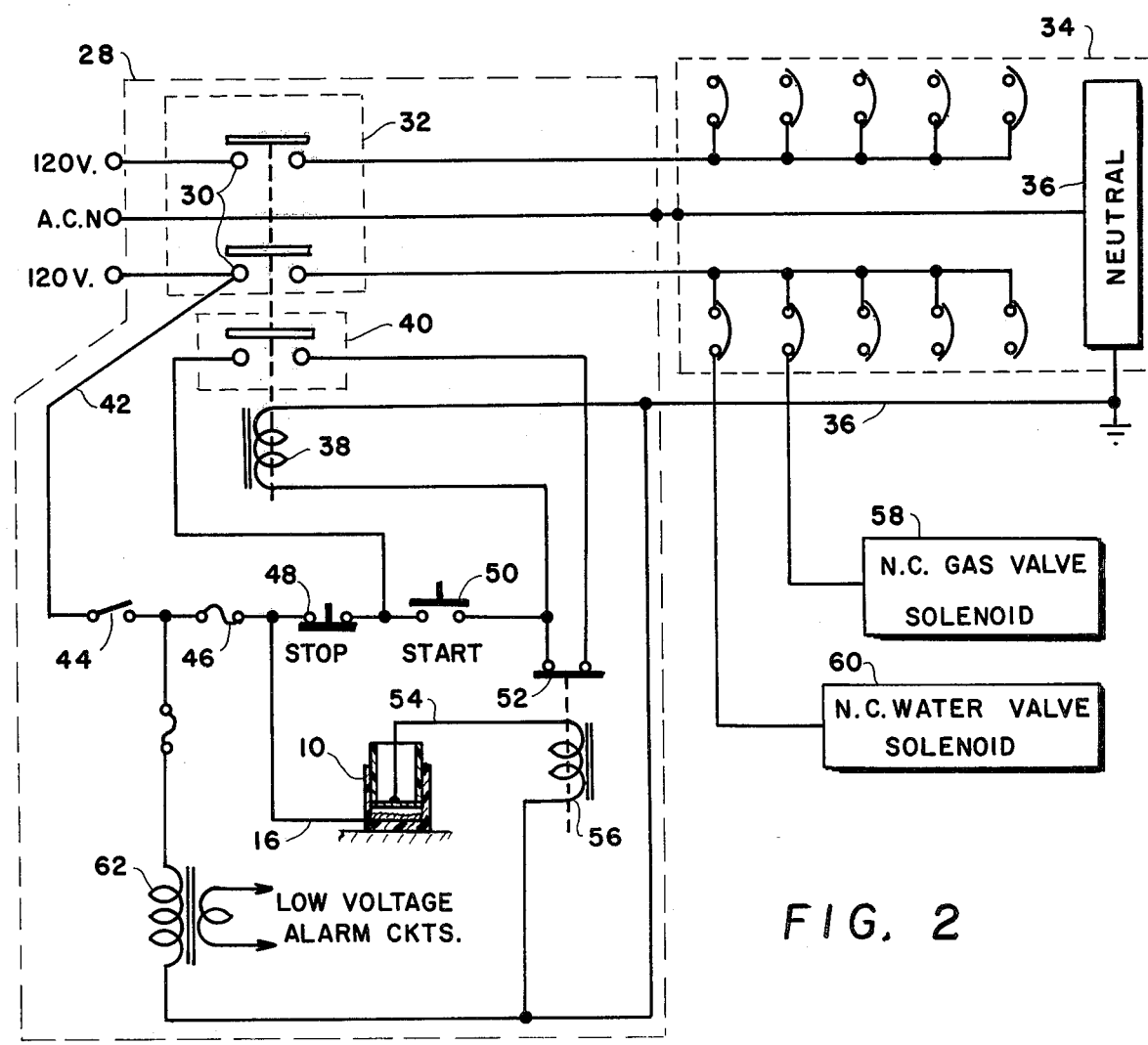
FIG. 2 is an electrical schematic diagram of the earthquake safety system employing heavy duty industrial type components.

FIG. 2 is a schematic diagram illustrating an earthquake safety system employing the adjustable sensitive trigger switch of FIG. 1. Electrical power from the utility meter box enters a metal housing or cabinet 28 and is applied directly to the input contacts 30 of a normally open contactor 32 of desired capacity, the output contacts of which are applied directly through conductors to a power distribution circuit-breaker box 34. A neutral conductor entering cabinet 28 is applied directly to a neutral bus 36 in the breaker box 34.

The normally open contactor 32 is closed by an excitation coil 38 which also closes the contacts on a normally open interlock 40 which is mechanically linked to the contactor 32 for operation therewith. If desired, the contactor 32 may include several contact pairs, one of which may be used as the contacts of the interlock 40.

An electrical conductor 42 is connected to one of the input contacts 30 of the contactor 32. The conductor 42 is coupled through an on/off toggle switch 44 and through a fuse 46, having approximately a 3-ampere rating, to one terminal of a normally-closed, momentary-open, manually operated "stop" switch 48. The second contact of the switch 48 is coupled to one contact of the normally-open momentary-contact, manually operated "start" switch 50, the second terminal of which is connected through the excitation coil 38 to the neutral bus 36. The output contact of the start switch 50 is also connected to one contact of a normally-closed relay 52, the second contact of which is applied, via a conductor 54, to one contact of the normally-open interlock 40, the second contact of which is coupled to the interconnection of switches 48 and 50.

The intersection of the fuse 46 and the normally closed switch 48 is connected via the conductor 16 of FIG. 1 to the electrically conductive fluid, such as mercury, in the shock-sensitive switch 10. A conductor 54, one end of which is soldered to the conductive disc at the bottom of the core member 18 of the switch 10, is coupled through the excitation coil 56 of the relay 52 to a neutral conductor.

As illustrated in FIG. 2, two of the circuit breakers in the power distribution box 34 are used to apply excitation power to the solenoid of a normally-closed gas valve 58 and to a similar solenoid of a normally-closed water valve 60. Also illustrated in FIG. 2 is a fused circuit including a stepdown transformer 62 coupled between a neutral conductor and the junction of the circuit switch 44 and fuse 46. It will be noted that the transformer 62 receives its power at the input terminals 30 of the contactors 32 and will therefore always be able to produce a low voltage output for alarm circuits such as smoke detectors, burglar alarms, etc., irrespective of the power availability in the remainder of the building to which the safety system is applied.

In operation, switch 44 is closed and momentary-contact of the start switch 50 applies excitation current through the coil 38 to close the contacts of the contactor 32 and the interlock 40. Upon release of the momentary-contact start switch 50, current flows through the contacts of the interlock 40 and through the closed contacts of the relay 52 to apply current through the excitation coil 38. If it is desired to open the contactor 32, a momentary depression of the stop switch 48 will break the current path to the excitation coil 30 and will open the contacts of the contactor 32 and interlock 40.

During normal operating conditions, the normally open contacts of the contactors 32 and interlock 40 are closed by the current through the excitation coil 38. If the system is jolted to the point where the mercury in the base of the sensitive switch 10 completes the electrical contact between the conductors 16 and 54, current passing therethrough is applied through the coil 56 of relay 52 to open the normally-closed contacts and to thereby remove current from the excitation coil 38. This results in an opening of the contacts of the contactors 32 and interlock 40. Power no longer being supplied to the breaker box 34 is therefore removed from the normally-closed gas valve 58 and normally-closed water valve 60 to instantly remove the danger of fire from broken gas pipes and the danger of water damage and possible loss of water pressure from broken water pipes.

Figure 3:
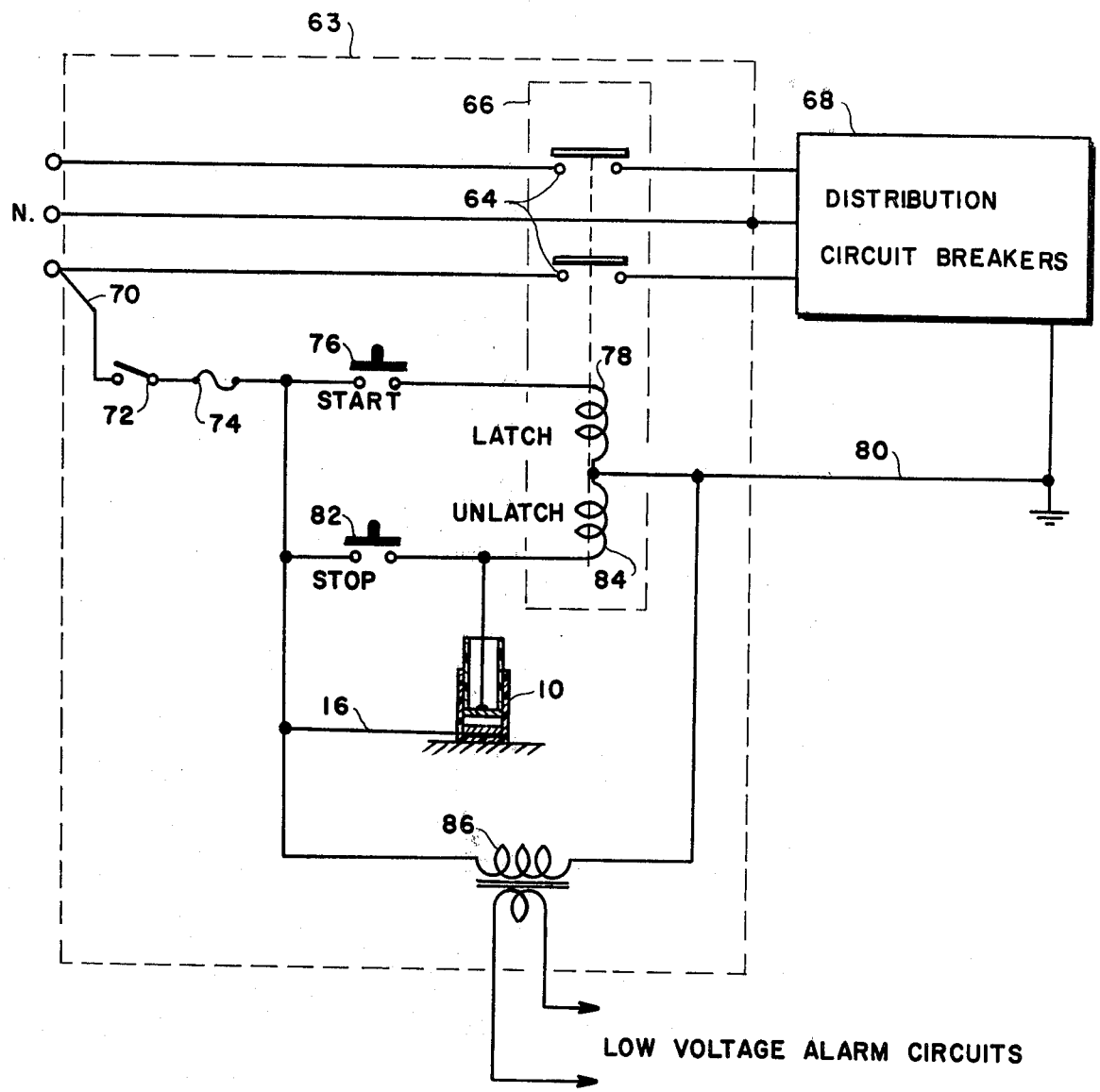
FIG. 3 is an electrical schematic diagram of an alternate embodiment of the safety system particularly suitable for residential applications.

FIG. 3 is another embodiment of an earthquake safety circuit employing the sensitive trigger switch 10. A.C. power from the utility meter box enters the metallic cabinet 63 of the safety circuit and is applied to the input contacts 64 of a latching contactor 66, a commercially available item available, for example, from the Square D Corporation. The output terminals of the latching contactor 66 are applied to a distribution breaker box 68 such as described in connection with FIG. 2. A conductor 70 is coupled to one of the "hot" input terminals entering the cabinet 62 and is applied through an on/off switch 72 and fuse 74 to one terminal of a normally-open, momentary-contact, start switch 76, the secondary contact of which is coupled through the contactor's latching coil 78 to a neutral conductor 80. The junction of the fuse and the start switch 76 is also connected to the input contact of a normally-open, momentary-contact, stop switch 82, the secondary contact of which is coupled through the contactor's unlatching coil 84 to the neutral conductor 80. The stop switch 82 is shunted by the adjustable shock-sensitive switch 10 of FIG. 1 so that a momentary contact produced by a shock or earthquake will cause the switch 10 to conduct through the unlatching coil 84 to thereby unlatch the contactor 66 and break the power into the distribution breaker box 68. As with the embodiment illustrated in FIG. 2, a low voltage alarm circuit may be produced by a step-down transformer 86 coupled between the neutral conductor 80 and the junction of fuse 74 and switch 76.

The embodiment illustrated in FIG. 3 employing a latching contactor is best suited for smaller installations such as residential buildings requiring 100 to 200 amperes of 240-volt single-phase service. The embodiment illustrated in FIG. 2 is best suited for large industrial applications inasmuch as an excitation coil, such as the coil 38, may be operated to control the operation of the contactor having many high-current contacts for providing a plurality of three-phase circuits to the facility. It will be noted that the embodiment illustrated in FIG. 2 requires a continuous operation excitation coil 38 whereas the coils 78 and 84 of FIG. 3 only draw momentary current during the depressing of the switches 76 or 82 or during a shock generated contact of the sensitive switch 10.

I claim:

1. A safety system for instantaneously switching off electricity upon occurrence of a shock of predetermined magnitude, said system including:
   a power distribution box having an input terminal and a plurality of electric output terminals;
   an electrical power contactor connected into the electrical path between input power terminals of the safety system and said distribution box input terminals, the contacts of said contactor being closed by current flow through a first electrical winding and being opened by current flow through a second electrical winding; and
   an adjustable shock-sensitive switch coupled between one of said input power terminals and said second electrical winding, said shock-sensitive switch comprising:
   a vertical tubular non-conductive housing having a first electrical conductor overlying the internal floor thereof, said conductor being a first electrical terminal of said switch;
   an electrically conductive fluid within said non-conductive housing, said fluid overlying said first electrical conductor;
   a core member vertically slidable within the bore of said housing, said core member having an electrically conductive floor providing a second electrical terminal of said switch, the bottom surface of said electrically conductive floor being spaced from the top surface of said conductive fluid; and
   means coupled between said core member and said housing for clamping said member and said housing against relative vertical movement.

2. The safety system claimed in claim 1 further including circuitry including a momentary contact "start" switch for applying current through said first electrical winding for closing said electrical power contactor.

3. The safety system claimed in claim 2 wherein said contactor is a latching contactor mechanically latched closed by the application of electric current through said first winding and unlatched by the application of electrical current through said second winding.

4. The safety system claimed in claim 2 wherein said contactor is closed and maintained closed by the application of a continuous current through said first electrical winding and opened by opening the circuit through said first winding by the opening of normally-closed relay contacts in series with said first winding and actuated by current through said second electrical winding.

5. The safety system claimed in claim 3 or 4 further including a normally closed solenoid-operated gas valve coupled to one of said plurality of output terminals in said power distribution box for shutting off a gas supply upon the opening of said electrical power contactor.

6. The safety system claimed in claim 5 further including a normally closed solenoid-operated water valve connected to one of said plurality of output terminals in said power distribution box for shutting off a water supply upon the opening of said electrical power contactor.

7. The safety system claimed in claim 5 further including a step-down transformer having a primary winding coupled to a power conductor ahead of said contactor, said transformer providing a secondary voltage output of low voltage alarm circuits independent of the position of said electrical power contactor.

* * * * *